United States Patent
Snider

(10) Patent No.: US 6,178,916 B1
(45) Date of Patent: *Jan. 30, 2001

(54) COMPACT, LOW-COST, ROTARY KNOB WITH INDICATOR

(75) Inventor: Chris Ralph Snider, Kokomo, IN (US)

(73) Assignee: Delco Electronics Corporation, Kokomo, IN (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/009,427

(22) Filed: Jan. 20, 1998

(51) Int. Cl.[7] .................................................. G01D 13/00
(52) U.S. Cl. ............................ 116/284; 116/305; 116/309
(58) Field of Search ................................. 116/306, 309, 116/310, 311, 312, 313, 314, 315, 316, 317, 318, 319, 320

(56) References Cited

U.S. PATENT DOCUMENTS

| | | | |
|---|---|---|---|
| 3,404,657 | * 10/1968 | Zmuda | 116/309 |
| 3,481,305 | * 12/1969 | Ogawa | 116/310 |
| 3,486,386 | * 12/1969 | Laubenfels | 116/315 X |
| 4,594,070 | * 6/1986 | Stoddard | 116/309 X |
| 5,564,812 | * 10/1996 | Berardi | 116/310 X |

FOREIGN PATENT DOCUMENTS

| | | | |
|---|---|---|---|
| 2737916 | * 5/1978 | (DE) | 116/309 |
| 641271 | * 8/1950 | (GB) | 116/320 |

* cited by examiner

*Primary Examiner*—Hezron Williams
*Assistant Examiner*—W. Morris Worth
(74) *Attorney, Agent, or Firm*—Jimmy L. Funke

(57) ABSTRACT

In a preferred embodiment, a compact, low-cost, rotary control knob assembly, including: an indicator portion having disposed thereon indicia representing selectable settings of the control knob assembly; a knob portion disposed over the indicator portion, such that the indicia are contained within a perimeter-defined area of the knob portion; and an indicator opening defined through the knob portion, which indicator opening is selectively alignable with ones of the indicia by rotation of the knob portion with respect to the indicator portion.

10 Claims, 4 Drawing Sheets

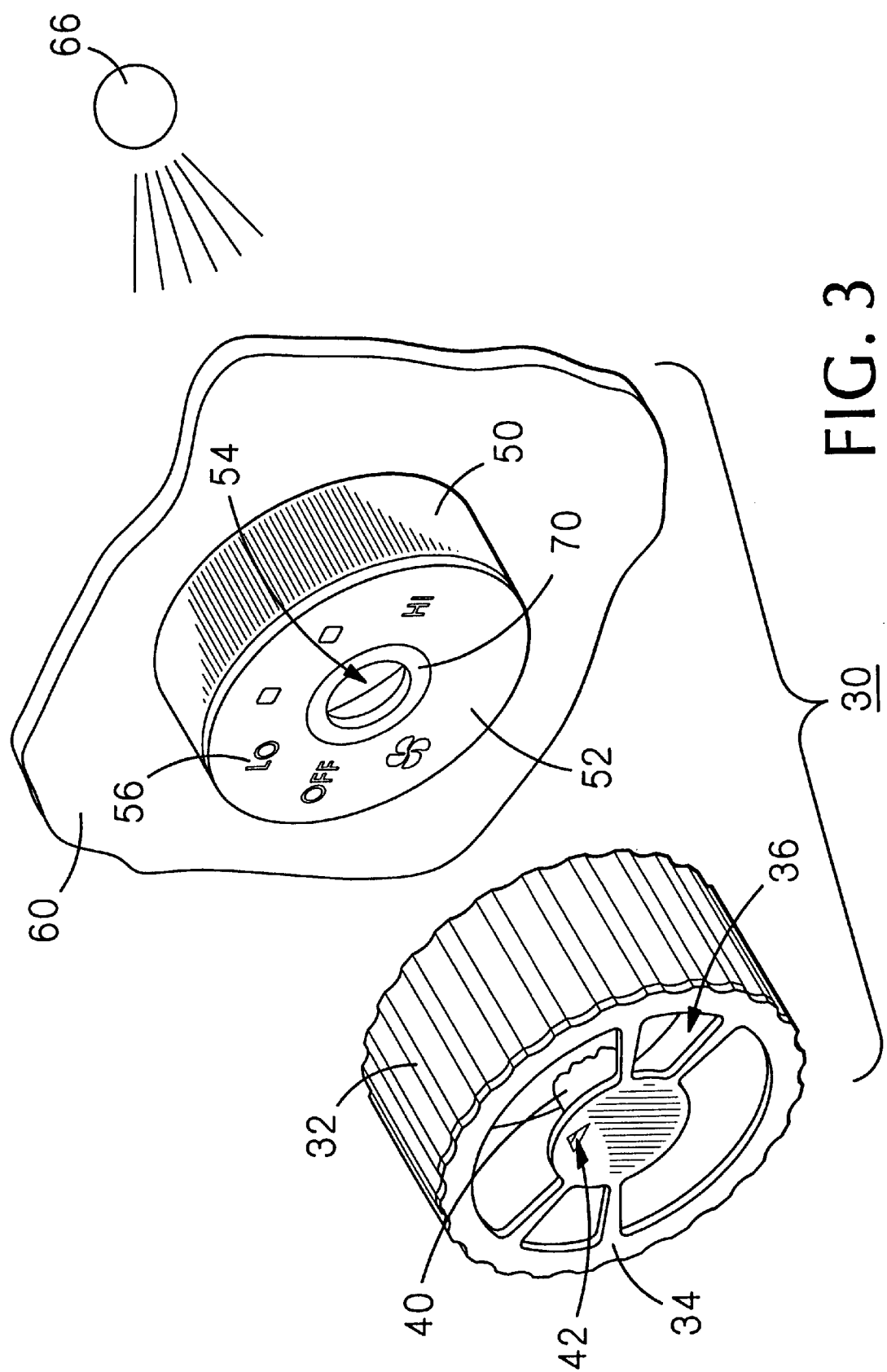

COMPACT, LOW-COST, ROTARY KNOB WITH INDICATOR

BACKGROUND OF THE INVENTION

1. Field of the Invention

The present invention relates to rotary control knobs generally and, more particularly, but not by way of limitation, to a novel, compact, low-cost, rotary control knob and indicator.

2. Background Art

Rotary control knobs are used in a variety of applications. While the present invention is described, for illustrative purposes only, as being applied to rotary control knobs in a vehicle, it will be understood that rotary control knobs of the present invention may be applied to any use in which it is desired to graphically represent the setting of a rotary control knob.

In vehicle applications, rotary knobs are employed, for example, to control environmental air flow and temperature in the vehicle operator/passenger compartment. Typically, such a control knob has a pointer that indicates the setting of the control knob by pointing to a control setting represented graphically on an arcuate scale circumjacent the knob. The pointer and the scale are illuminated by backlighting at night when the lights of the vehicle are turned on. Such a conventional control knob is typically injection molded of thermoplastic materials and is relatively expensive to manufacture, since it requires the use of either a multistep molding process or the injection of two or more separate different colored or clear materials in a single mold.

A single-material control knob can be fabricated in which the pointer is not backlighted, but, rather, the pointer extends from the periphery of the control knob and covers a desired setting on the graphical scale. With this arrangement, of course, one cannot view the setting that is covered. In some cases, the setting can be inferred from adjacent, non-covered settings, but, in other cases, it cannot.

With both of the above conventional rotary control knobs, the area required for the total layout comprises the area of the knob and the surrounding graphical representation. In some cases, this area consumed is less compact than is desirable.

Accordingly, it is a principal object of the present invention to provide a rotary control knob which is cast of a single material, but which can be backlighted.

It is a further object of the invention to minimize the area that a rotary control knob and the accompanying graphical representation consume, preferably no more than the area of the knob itself.

It is an additional object of the invention to provide such a rotary control knob which can be economically manufactured using conventional techniques known in the art.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a compact, low-cost, rotary control knob assembly, comprising: an indicator portion having disposed thereon indicia representing selectable settings of said control knob assembly; a knob portion disposed over said indicator portion, such that said indicia are contained within a perimeter-defined area of said knob portion; and indicating means defined through said knob portion, which indicating means is selectively alignable with ones of said indicia by rotation of said knob portion with respect to said indicator portion.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which:

FIG. 3 is a fragmentary, exploded isometric view showing the elements of a rotary control knob according to the present invention.

DETAILED DESCRIPTION OF THE PREFERRED EMBODIMENTS

Figure 1:
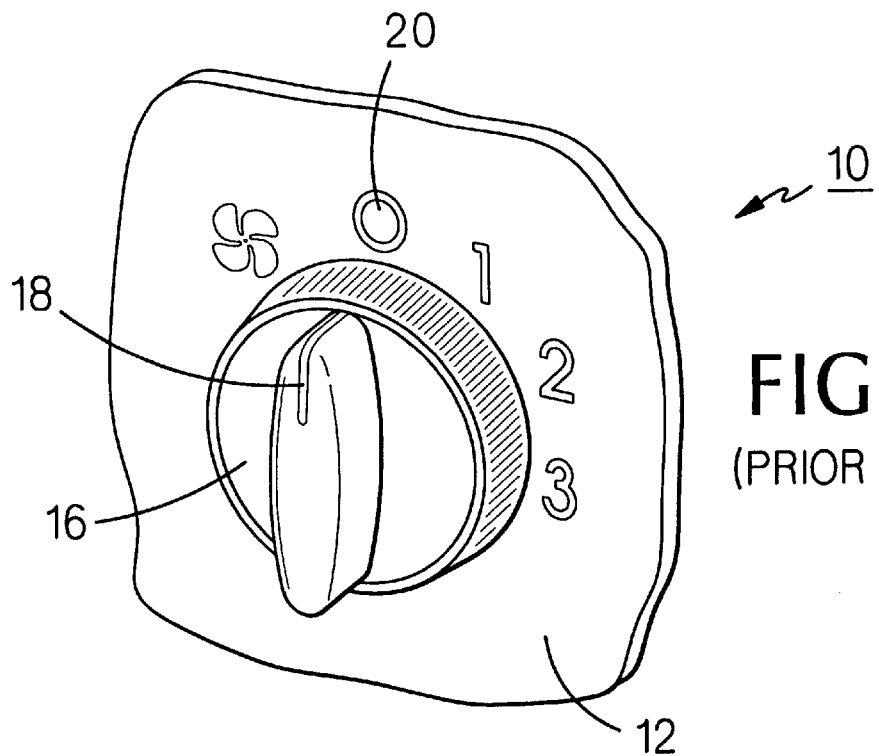
FIGS. 1 and 2 are fragmentary isometric view of conventional rotary control knobs and associated graphical representations.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

FIG. 1 illustrates one type of conventional rotary control knob arrangement, generally indicated by the reference numeral 10, mounted in a panel 12 which panel may be assumed to be, for example, the dashboard of a vehicle and the arrangement may be assumed to be, for example, a ventilation air flow control. A rotary control knob 16 is rotatably mounted in panel 12 and includes thereon an indicator or pointer 18 which selectively points to one of the control settings indicated on graphics, as at 20, circumjacent knob 16 and disposed on panel 12 by conventional means. Pointer 18 and graphics 20 are clear or semi-translucent so as to render them susceptible to backlighting illumination by means not shown. It will be understood that knob 16 is connected to a shaft or other such means (none shown) to selectively control a switch (not shown).

In order that pointer 18 may be backlighted or otherwise highlighted by backlighting, it is necessary that the materials of the pointer and knob 16 be different so that there is a difference in color between the pointer and the knob. As noted above, this requires employing either a multiple-step molding process or a complicated two-material, single-step molding process. In some cases, a third material is used for the perimeter of knob 16 to enhance manual grasping thereof. As an alternative manufacturing process, the various elements may be separately produced and then subsequently joined.

Figure 2:
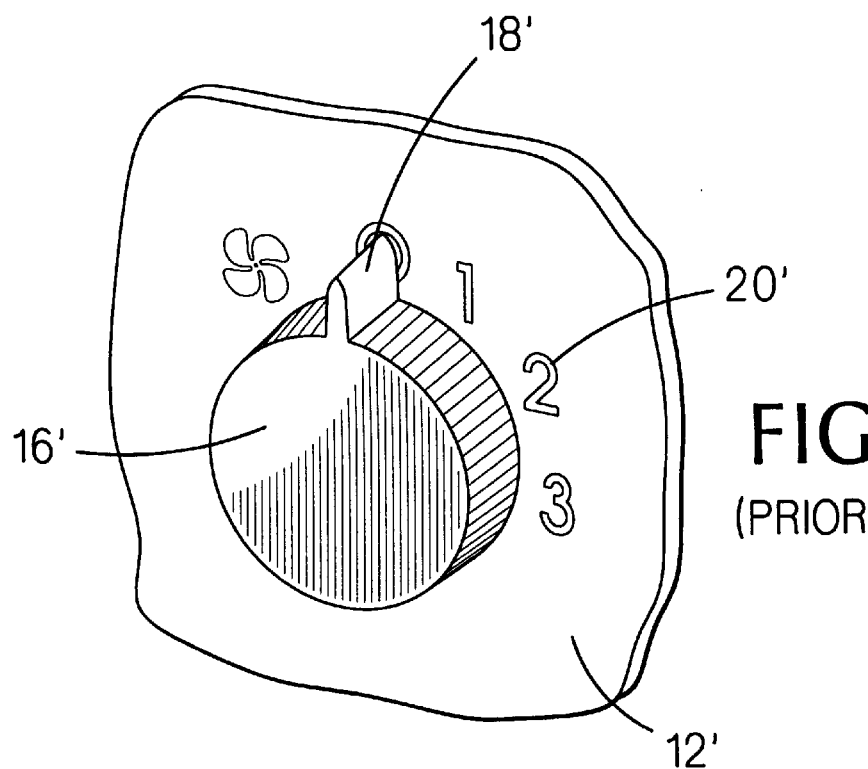

FIG. 2 illustrates another type of conventional rotary control knob arrangement, generally indicated by the reference numeral 10', and mounted in a panel 12'. Here, a rotary control knob 16' includes a pointer 18' that extends from the periphery of the knob and selectively covers graphics, as at 20'. Rotary control knob 16' and pointer 18' can be molded of a single material in a single step; however, pointer 18' cannot be backlighted and there is the further disadvantage that a portion of graphics 20' is covered.

FIG. 3 illustrates the elements of a rotary control knob assembly, constructed according to the present invention, and generally indicated by the reference numeral 30. Knob assembly 30 includes a generally hollow, cylindrical knob portion 32 having an end face 34 extending across and partially closing the upper end thereof, the end face having a plurality of openings defined therethrough, as at 36. A shaft 40, fixedly attached to the rear surface of end face 34 extends rearwardly therefrom coaxial with knob portion 32. It will be understood that shaft 40 will be connected to a control element (not shown) which may be assumed to be, for example, an environmental ventilation air control switch in a vehicle. End face 32 includes a diamond-shaped pointer opening 42 defined therethrough.

Rotary control assembly 30 also includes a generally hollow, cylindrical indicator portion 50 having an end face 52 extending across and partially closing the upper end thereof, the end face having a central opening 54 defined therethrough such that shaft 40 can be inserted through the central opening. End face includes disposed thereon by conventional means graphic indicia, as at 56, to indicate the position of knob portion 32 when the knob portion is disposed over indicator portion 50. Indicator portion 50 is fixedly attached to a panel 60 which panel may be assumed to be a portion of the dashboard of a vehicle.

A source of backlighting 66 is disposed so as to backlight graphic indicia 56 and pointer opening 42. An annular ring 70 may be disposed around central opening 54 in the path from light source 66 to pointer opening 42 to provide the pointer opening with a selected color. Alternatively, annular ring 70 may be omitted and pointer opening 42 illuminated directly from light source 66.

When assembled, knob portion 32 will fit over indicator portion 50 and will be rotatably secured in that position by means of the attachment of shaft 40 to the control element (not shown).

It will be understood that knob portion 32 can be economically manufactured of one material in a conventional one-step molding process from a suitable thermoplastic material. Indicator portion 50 may be similarly manufactured. It will be noted that having graphic indicia 56 disposed within the outer periphery of knob portion 32 reduces the total area required by knob assembly 30 compared with conventional rotary control knobs (FIGS. 1 and 2). This offers greater compactness for control clusters and a cleaner, more streamlined appearance. A further advantage of the compactness of knob assembly 30 is that the area and/or number of the backlighting means can be reduced.

Figure 4A:
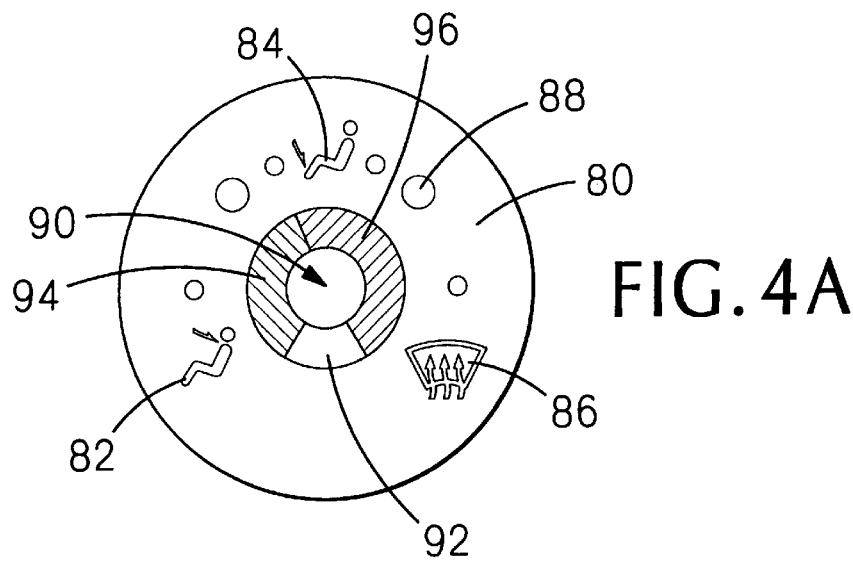
FIG. 4A is a top plan view showing one type of graphical representation for use in a rotary control knob according to the present invention.

FIG. 4A illustrates an indicator portion end face 80 which may be assumed to be, for example, part of a vehicle environmental ventilation air control. End face 80 has disposed thereon graphic indicia including an icon 82 indicating air flow from a dashboard vent, an icon 84 indicating air flow at floor level, and an icon 86 indicating air flow to a windshield defroster. Intermediate settings are indicated by circles, as at 88. Icons 82, 84, and 86 and circle 88 can be backlighted by suitable means (not shown). A central opening 90 is provided for the insertion therethrough of a shaft such as shaft 40 (FIG. 3). Surrounding central opening 90 is an annular translucent ring 92 having a blue segment 94 and a red segment 96.

Figure 4B:
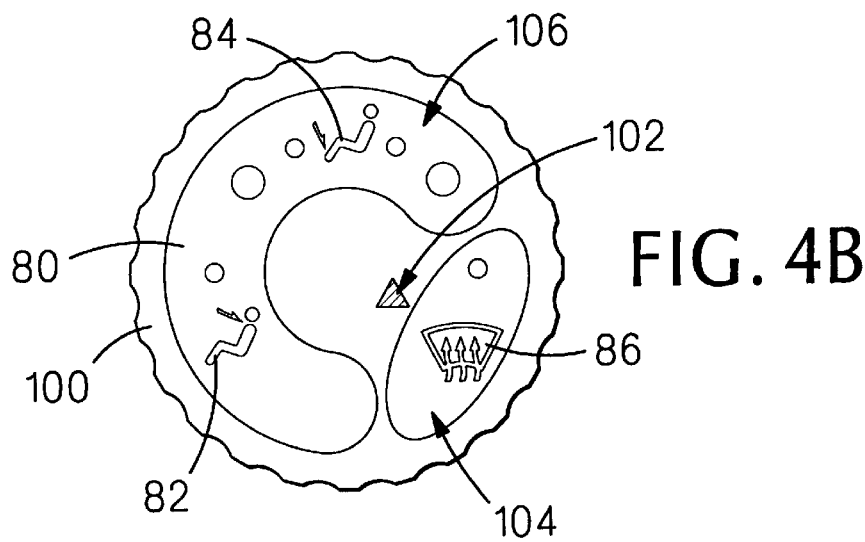
FIG. 4B is a top plan view showing one setting of a rotary control knob with the graphical representation of FIG. 4A.

FIG. 4B illustrates a knob end face 100 having defined therethrough a pointer opening 102, a relative small oval opening 104 through which is visible with which one of the graphic indicia the pointer opening is aligned, and a relatively large arcuate opening 106 through which are visible the rest of the graphic indicia. In the orientation shown, pointer opening 102 is aligned with icon 86 and, in this position, the pointer opening will be aligned with red segment 96 and will, therefore, appear red, indicating a heating mode.

Figure 4C:
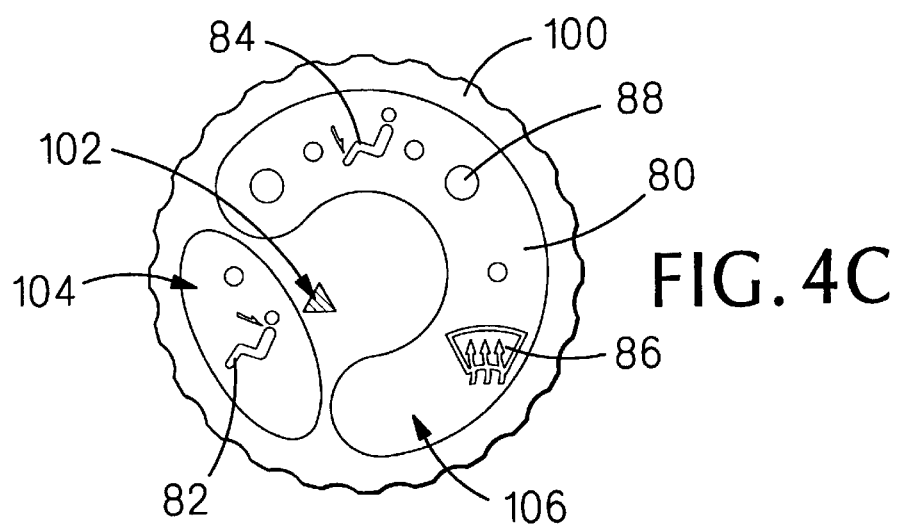
FIG. 4C is a top plan view showing another setting of the rotary control knob with the graphical representation of FIG. 4A.

FIG. 4C illustrates knob end face 80 rotated to a position in which pointer opening 102 is aligned with icon 82. In this position, the pointer opening will appear to be blue by virtue of the fact that it is disposed over segment 94 (FIG. 4A), indicating a cooling mode. It will be understood that knob end face 100 may be similarly rotated to any of the intermediate positions indicated by circles 88.

Figure 5:
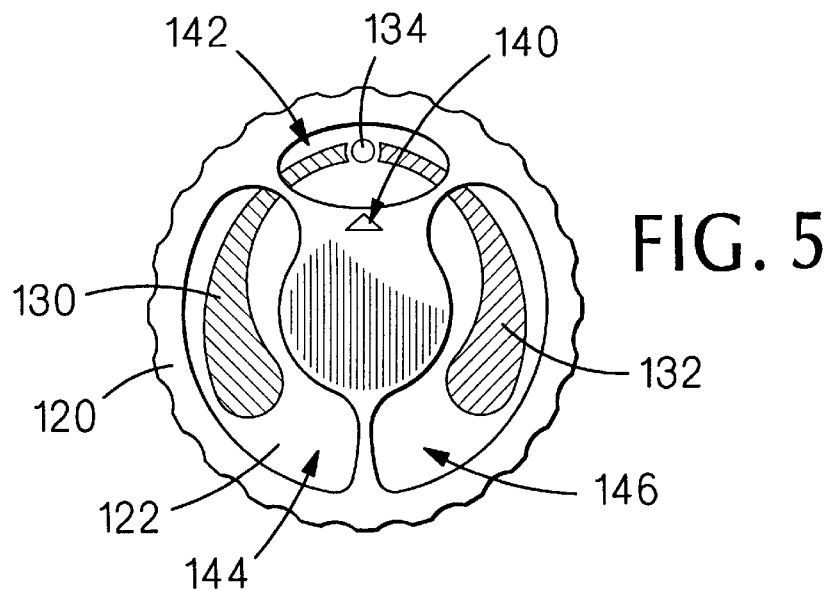
FIG. 5 is a top plan view showing another rotary control knob according to the present invention.

FIG. 5 illustrates a knob end face 120 disposed over an indicator end face 122 in an assembly which may be assumed to be, for example, part of a environmental temperature control system in a vehicle. Indicator end face 122 includes disposed thereon a blue band 130 and a red band 132, the bands expanding in width in proportion to the distance from a neutral position 134 and representing, respectively, increasing level of cooling or heating. Knob end face includes defined therethrough a triangular-shaped pointer opening 140, a relatively small oval opening 142 through which is visible the portion of graphics on indicator end face 122 with which the pointer opening is aligned, and two relatively large arcuate openings 144 and 146 through which are visible the rest of the graphic indicia on indicator end face 122.

Figure 6:
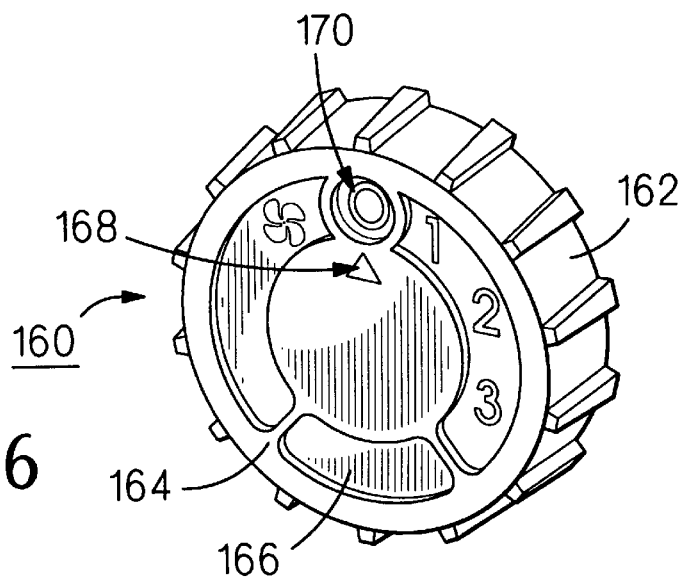
FIGS. 6 and 7 are isometric views of further alternative rotary control knobs according to the present invention.

FIG. 6 illustrates another embodiment of a control knob assembly, generally indicated by the reference numeral 160, and constructed according to the present invention. Assembly 160 includes a knob portion 162 with an end face 164 disposed over an indicator end face 166, knob end face 164 including a triangular-shaped pointer opening 168 defined therethrough. The principal difference between assembly 160 and previously described embodiments is the provision of a circular opening 170 which highlights the graphic indicia on indicator end face 166 with which pointer opening 168 is aligned. In this embodiment, pointer opening 168 may be eliminated.

Figure 7:
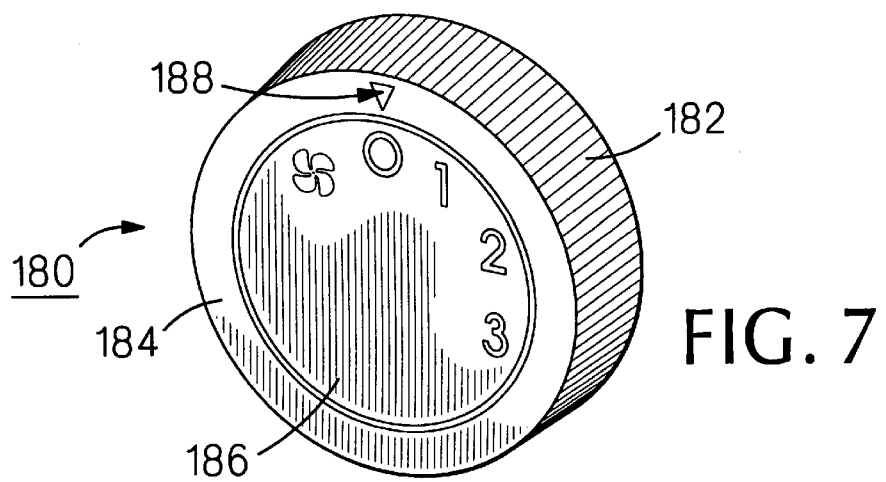

FIG. 7 illustrates yet another embodiment of a control knob assembly, generally indicated by the reference numeral 180, and constructed according to the present invention. Assembly 180 includes a knob portion 182 with an end face 184 disposed over an indicator end face 186, knob end face 184 including a triangular-shaped pointer opening 188 defined therethrough. The principal difference between assembly 180 and previously described embodiments is that pointer opening 188 points inwardly toward indicia on indicator end face 186, while the pointer openings in the previously described embodiments point outwardly toward the indicia on the indicator end face.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

What is claimed is:

1. A compact, low-cost, rotary indicator knob assembly, comprising:
   (a) an indicator portion having disposed thereon indicia representing selectable settings of said indicator knob assembly;
   (b) a knob portion disposed over said indicator portion, such that said indicia are contained within a perimeter-defined area of said knob portion;
   (c) at least one pointer opening defined through said knob portion, which said at least one pointer opening is selectively alignable with ones of said indicia by rotation of said knob portion around said indicator portion and through which said pointer opening at least one of said ones of said indicia are visible;
   (d) said indicator portion being a generally hollow, cylindrical member, having a least a partially closed upper end on which said upper end said indicia are disposed, and being attachable to a front surface of a stationary mounting panel; and
   (e) said knob portion being a generally hollow, cylindrical member, coaxial with said indicator portion, having a sidewall extending over a sidewall of said indicator portion, having a partially closed upper end adjacent said upper end of said indicator portion, through which said upper end of said knob portion said at least one pointer opening is defined, and having an external cylindrical manual gripping surface.

2. A compact, low-cost, rotary indicator knob assembly, as defined in claim 1, wherein: said at least one pointer opening comprises at least one opening defined through said knob portion.

3. A compact, low-cost, rotary indicator knob assembly, as defined in claim 1, wherein: said at least one pointer opening points inwardly toward a center axis of said knob portion and said indicia.

4. A compact, low-cost, rotary indicator knob assembly, as defined in claim 1, wherein: said at least one pointer opening points outwardly toward said indicia.

5. A compact, low-cost, rotary indicator knob assembly, as defined in claim 1, further comprising: an indicator opening defined through said knob portion through which indicator opening is visible which of said ones of said indicia said at least one pointer opening is aligned.

6. A compact, low-cost, rotary indicator knob assembly, as defined in claim 5, further comprising: at least one additional opening defined through said knob portion through which at least one additional opening is visible at least part of said ones of said indicia with which said at least one pointer opening is not aligned.

7. A compact, low-cost, rotary indicator knob assembly, as defined in claim 6, further comprising: colored portions included with said indicia and said at least one knob portion also includes a further additional opening defined through said knob portion which is alignable with one of said colored portions to indicate whether a selected one of said ones of said indicia represents a heating function or a cooling function.

8. A compact, low-cost rotary indicator knob assembly, as defined in claim 7, wherein: said colored portions vary such that said additional area indicates degree of intensity of said heating function or said cooling function.

9. A compact, low-cost, rotary indicator knob assembly, as defined in claim 1, wherein: said indicia and said at least one pointer opening are backlightable.

10. A compact, low-cost rotary indicator knob assembly, as defined in claim 1, wherein: said knob portion is formed of a single material.

* * * * *